United States Patent
Mildice et al.

(10) Patent No.: US 6,252,331 B1
(45) Date of Patent: Jun. 26, 2001

(54) BRUSHLESS, SEPARATELY-EXCITED, VARIABLE-SPEED MOTOR AND AC GENERATOR/ALTERNATOR WITH SOLENOID-WOUND, BIPHASE AC ROTOR

(76) Inventors: James W. Mildice, 12505 Birch Bluff Pl., San Diego, CA (US) 92131; James E. Hollopeter, 12543 Pomerado Ct., San Diego, CA (US) 92128; Donald M. Westergren, 3942 Calavo Dr., La Mesa, CA (US) 91941

( * ) Notice: Subject to any disclaimer, the term of this patent is extended or adjusted under 35 U.S.C. 154(b) by 0 days.

(21) Appl. No.: 09/407,797

(22) Filed: Sep. 29, 1999

Related U.S. Application Data

(63) Continuation-in-part of application No. 08/933,271, filed on Sep. 18, 1997, now abandoned.

(51) Int. Cl.⁷ ............................................. H02K 1/24
(52) U.S. Cl. .................... 310/263; 310/261; 310/113; 310/185; 310/195
(58) Field of Search ........................ 310/263, 261, 310/168, 112, 114, 113, 179, 184, 185, 198, 195

(56) References Cited

U.S. PATENT DOCUMENTS

| | | |
|---|---|---|
| 3,283,191 * | 11/1966 | Carruth .................. 310/263 |
| 4,039,909 | 8/1977 | Baker . |
| 4,112,475 | 9/1978 | Stitt et al. . |
| 4,344,025 | 8/1982 | Okuyama et al. . |
| 4,491,778 | 1/1985 | Knox et al. . |
| 4,503,377 | 3/1985 | Kitabayashi et al. . |
| 4,695,939 | 9/1987 | Canay . |
| 4,780,658 | 10/1988 | Koyama . |
| 4,818,890 | 4/1989 | Mose et al. . |
| 4,956,596 | 9/1990 | Ogashi . |
| 4,994,684 | 2/1991 | Lauw et al. . |
| 5,003,243 | 3/1991 | Tadakuma . |
| 5,028,804 | 7/1991 | Lauw . |
| 5,047,704 | 9/1991 | Yamauchi . |
| 5,239,251 | 8/1993 | Lauw . |
| 5,270,498 | 12/1993 | Tanahashi . |
| 5,365,153 | 11/1994 | Fujita et al. . |
| 5,387,855 | 2/1995 | Miyazaki et al. . |
| 5,430,362 | 7/1995 | Carr et al. . |

FOREIGN PATENT DOCUMENTS

| | | | |
|---|---|---|---|
| 386547 * | 8/1961 | (CH) ........................... | 310/263 |
| 1950364 * | 6/1970 | (DE) ........................... | H02K/1/00 |

* cited by examiner

Primary Examiner—Burton S. Mullins
(74) Attorney, Agent, or Firm—Brown Martin Haller & McClain

(57) ABSTRACT

A rotating electrical machine includes a two-phase rotor having two non-rotating solenoid-wound rotor coil assemblies and two interleaved pole assemblies. Each pole assembly is magnetically coupled to its respective coil assembly and rotates together with the machine shaft. Each pole assembly has four or more elongated pole pieces, two of which couple with one pole of a coil assembly and two of which couple with the other pole of that coil assembly. An exciter circuit independently controls the power variables provided to the rotor with respect to the stator to provide a variable-speed, variable-frequency (VSVF) motor system or VSVF generator system. The exciter energizes the solenoid-wound rotor coils with biphase AC electrical excitation, to produce a radial, rotating magnetic field at the pole pieces.

9 Claims, 12 Drawing Sheets

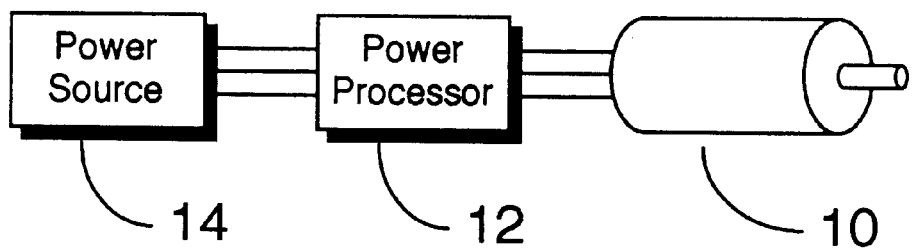
Figure 2a - (Prior Art)
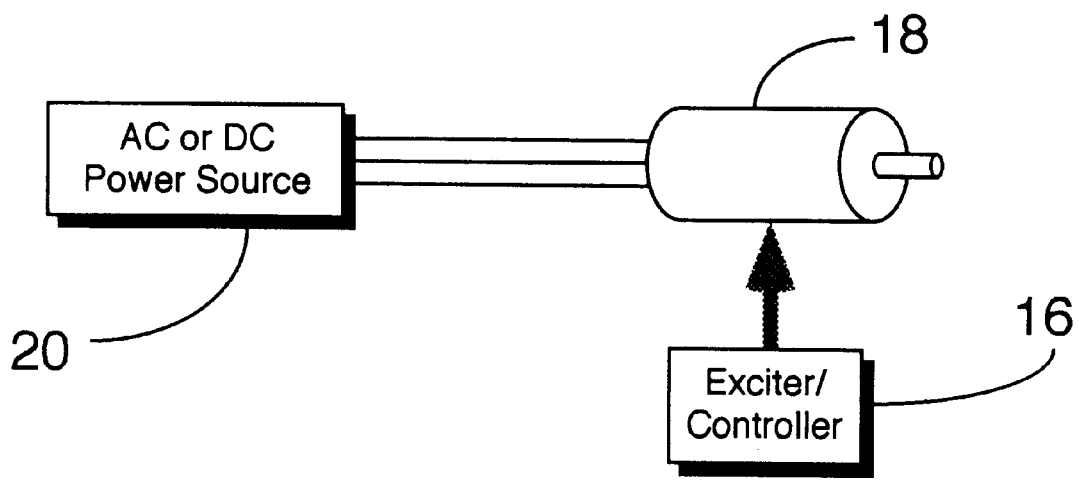
Figure 2b - (Prior Art)

BRUSHLESS, SEPARATELY-EXCITED, VARIABLE-SPEED MOTOR AND AC GENERATOR/ALTERNATOR WITH SOLENOID-WOUND, BIPHASE AC ROTOR

CROSS-REFERENCE TO RELATED APPLICATION

This is a continuation-in-part (CIP) of U.S. application Ser. No. 08/933.271, filed Sep. 18, 1997, now titled "VARIABLE SPEED UNIVERSAL MACHINE."

BACKGROUND OF THE INVENTION

1. Field of the Invention

This invention relates generally to electromagnetic machines and, more specifically, to a variable-speed, variable-frequency synchronous machine and system that can operate as a motor or generator/alternator, wherein the primary input and output parameters, such as rotational speed, frequency, and voltage, are fully decoupled from one another.

2. Description of the Related Art

As illustrated in FIG. 2a, many conventional electronically-controlled, variable-speed, alternating current (AC) motor drive systems include a conventional electromechanical machine, typically an induction motor 10. Such systems are taught by Knox, U.S. Pat. No. 4,491,778, and many others. On a first order basis, motor speed is proportional to its power input frequency. Motor 10 is made to run at a commanded speed, different from what is allowed by the prime power source, by interposing a variable-voltage, variable-frequency (VVVF) controller/power processor 12 between it and its power source 14.

Developments in power electronic components, embedded computers, and control understanding have enabled controller improvements, and allowed for many different control algorithms for specific applications. Such systems are not universally applied because of losses in the controller and the unavailability of controllers for large systems, since these controllers must process all of the power required by the system load. To improve efficiency, several system types have been proposed for part-time variable speed operation and part-time full-speed operation, with switching methods to support them.

Systems, such as that illustrated in FIG. 2b, have been proposed that obviate the need for a series-connected, full-power controller. U.S. Pat. No. 4,039,909, issued to Baker, discloses a variable-speed, variable-frequency, AC machine that does not require a full-power controller interposed between the machine and its power source. The Baker patent teaches a three-phase AC electromechanical machine that functions as a variable-speed, fixed-frequency (VSFF) motor 5; wherein the stator and rotor may be independently excited. Independent, three-phase rotor excitation produces a rotating magnetic field vector, which is independent of the rotor structure. Adjusting the angular velocity of the rotor magnetic field vector, by adjusting the frequency of its applied excitation power, may be used to control the machine's speed, through its interaction with the fixed-speed stator magnetic field vector. The rotor field is controlled by a three-phase VVVF exciter circuit 16, which is not in the source/load power path of the machine, i.e., is not coupled between motor 18 and its power source 20. The exciter is connected to the three-phase set of rotor windings by slip rings and brushes. Proper closed loop control through the exciter can duplicate any of the above VVVF control algorithms. The Baker patent further teaches that this basic operational method can also be applied to generators.

The Baker patent also proposes operation with DC power by interposing chopper circuitry so that the machine continues to operate on AC while used in DC systems. There is no direct operation as a motor or alternator with DC inputs or outputs.

U.S. Pat. No. 4,994,684, issued to Lauw, et al., discloses a specialized, three-phase exciter to be used with a "Baker" type machine. It controls the output of a dynamic rotor field alternator (with slip rings and brushes) to provide fixed-frequency power to a terrestrial power distribution grid, independent of the speed of the turbine driving the AC generator/alternator. The exciter is patented on the basis that it is a unique design, because it uses specialized control algorithms, particularly appropriate to the utility power grid application.

It is also known in the art that machine rotor windings need not be directly connected through slip rings and brushes, but rather can be coupled through a separate, secondary set of stator and rotor windings, which function as a rotary transformer. U.S. Pat. No. 5,028,804 also issued to Lauw teaches that a secondary set of conventional, three-phase rotor and stator windings can couple AC excitation power to the rotor of an alternator, to replace Baker's slip rings and brushes. The rotor power is connected to the primary three-phase rotor windings on a per-phase basis, to provide the controlled rotor excitation for output power frequency control, using the dynamic rotor field principle. A third Lauw Patent, U.S. No. 5,239,251 discloses that this basic brushless, rotating transformer approach can be used in a wound rotor motor which has Baker type dynamic rotor field control of the output speed.

While it eliminates the need for the in-line controller that processes 100% of the power used by most of today's variable-frequency, variable-speed, AC motor and generator systems, the implementation of the dynamic rotor field principle utilized in the Baker and Lauw patents suffers from a number of disadvantages. In the configurations disclosed in the Baker patents, both the motors and generators include wound, three-phase rotors energized through slip rings and brushes. This type of electromechanical machine is significantly more complex and expensive than an equivalent induction machine. The improvements to such machines suggested in the Lauw patents eliminate the slip rings and brushes, but at the cost of still more stator and rotor complexity. Therefore, neither configuration has found wide commercial acceptance.

U.S. Pat. No. 5,430,362, issued to Carr et al., discloses the use of an electromagnetic generator in its "reverse" direction as a motor to start an engine-driven power source (specifically, an aircraft auxiliary power unit (APU)) to eliminate the need for a separate starting motor. This machine is a compound synchronous machine having a permanent magnet armature portion and a separately-excited main armature. Brushless excitation is provided through a rotating, single-phase to three-phase transformer. The coupled AC power is rectified to DC to provide a constant magnetic field, with its vector fixed with respect to the rotor structure. When this machine is used as a variable-speed motor to bring the prime mover up to speed for starting, the rotor is energized with a fixed field through a brushless, rotating transformer-rectifier path. The three-phase stator windings that normally provide the power output are energized by a separate, full-power, three-phase, VVVF controller (called the "APU Start Converter"). The control algorithms for the VVVF controller are specifically designed to be compatible with unique machine switching, acceleration, and speed requirements when it is operated in the starting motor mode.

Although the above-described Baker and Lauw machines have radially-wound, AC rotors, solenoid-wound rotors which use DC excitation are also known. Many conventional automotive alternators have pole pieces which enclose a single, DC, solenoid-wound rotor coil. The pole pieces are magnetized from each end of the coil. They carry the magnetic field that the winding induces and are interleaved with opposite-end/opposite-polarity poles, such that north and south poles are alternated around the circumference of the rotor. The coil rotates with the rotor, and rotor electrical connections are made with slip rings and brushes.

The present invention overcomes the above-described problems and deficiencies in the art in the manner described below.

SUMMARY OF THE INVENTION

In one aspect, the present invention relates to a rotating electromechanical machine capable of operating as a fixed-frequency, variable-speed (FFVS) motor or variable-speed, fixed-frequency (VSFF) alternator; without using an in-line controller. It has a significantly improved structure, having an axis of rotation and includes a stator having one or more phases and two solenoid-wound rotor coils which have axially elongated, interleaved pole pieces. The rotor is excited by exactly two AC phases, and each of the two solenoid-wound rotor windings (one per phase) is coaxial with the axis of rotation and magnetically coupled to one or more north pole pieces and one or more south pole pieces. The solenoid-wound rotor windings do not rotate and are fixed with respect to the stator; only the pole pieces rotate. The rotor windings are contained within cup-shaped cores that promote magnetic coupling with the rotating pole pieces across a small gap. The rotor is thereby effectively separated into rotating and non-rotating elements, but the magnetic circuit through the pole pieces remains intact. This structure allows direct electrical connections to the non-rotating coils, obviating the need for slip rings and brushes or rotary transformers.

The stator may have a conventional, wound structure, with any suitable number of phases and poles. The stator may enclose the interleaved, extended pole pieces, which define the power portion of the rotor. As a motor, the stator coils may be wound for polyphase AC, single-phase AC, or DC. As an AC generator or alternator, the stator coils may be wound for polyphase AC or single-phase AC.

The entire assembly may be enclosed and supported by a generally conventional machine housing and bearing set supported by suitable end plates or other suitable structures.

In another aspect, the present invention further includes an electronic exciter that, in response to user input, independently controls the power variables provided to the rotor. Since the stator frequency is usually fixed, this rotor input controls the relationship between rotor and stator magnetic fields to achieve variable-speed, variable-frequency (VSVF) operation as a motor or AC generator/alternator. The exciter energizes the solenoid-wound rotor coils with biphase, VVVF, AC electrical power to produce a radial, rotating magnetic field at the rotor pole pieces enclosed by the stator; as required by the electromechanical machine for VSFF operation.

The exciter used in this machine system has several unique aspects. It is a two-phase, VVVF, AC power source, with a switched output power stage. It uses pulse width modulation (PWM) operation and control of an output bridge circuit to synthesize the two-phase, AC waveforms applied to the rotorwindings. It also uses a PROM-based waveform generator reference to control the shape of the excitation waveform. This shape is fundamentally a sinusoid, but it is adjusted/counter-distorted to minimize the main input or output current and voltage distortions inherent in motor and alternator systems. These are normally reduced by more complexwinding distributions and machine structures, and this electronic compensation simplifies the machine structure in this system.

As described above, the invention relates to a brushless machine having a solenoid-wound, biphase AC rotor (SW, BACR); and also relates to such a machine having a two-phase exciter that can independently control the relationship between the rotor and stator power variables to provide variable-speed, variable-frequency (VSVF) operation. It can function as an AC or DC motor or as an alternator/generator. In terms of classical machine type designations, it fits into the general category of separately-excited, synchronous machines.

DESCRIPTION OF THE DRAWINGS

Understanding of the present invention will be facilitated by consideration of the following detailed description of preferred embodiments of the present invention taken in conjunction with the accompanying drawings, in which like numerals refer to like parts, and in which:

FIG. 2a is a generalized block diagram of a prior art system in which an electric motor is controlled by a full-power, variable-voltage, variable-frequency (WVF) controller;

FIG. 2b is a conceptual block diagram of a prior art system in which an electric motor is powered directly from the utility source, and controlled by a VVVF exciter, to achieve VFVS operation;

DESCRIPTION OF PREFERRED EMBODIMENTS

Figure 1:
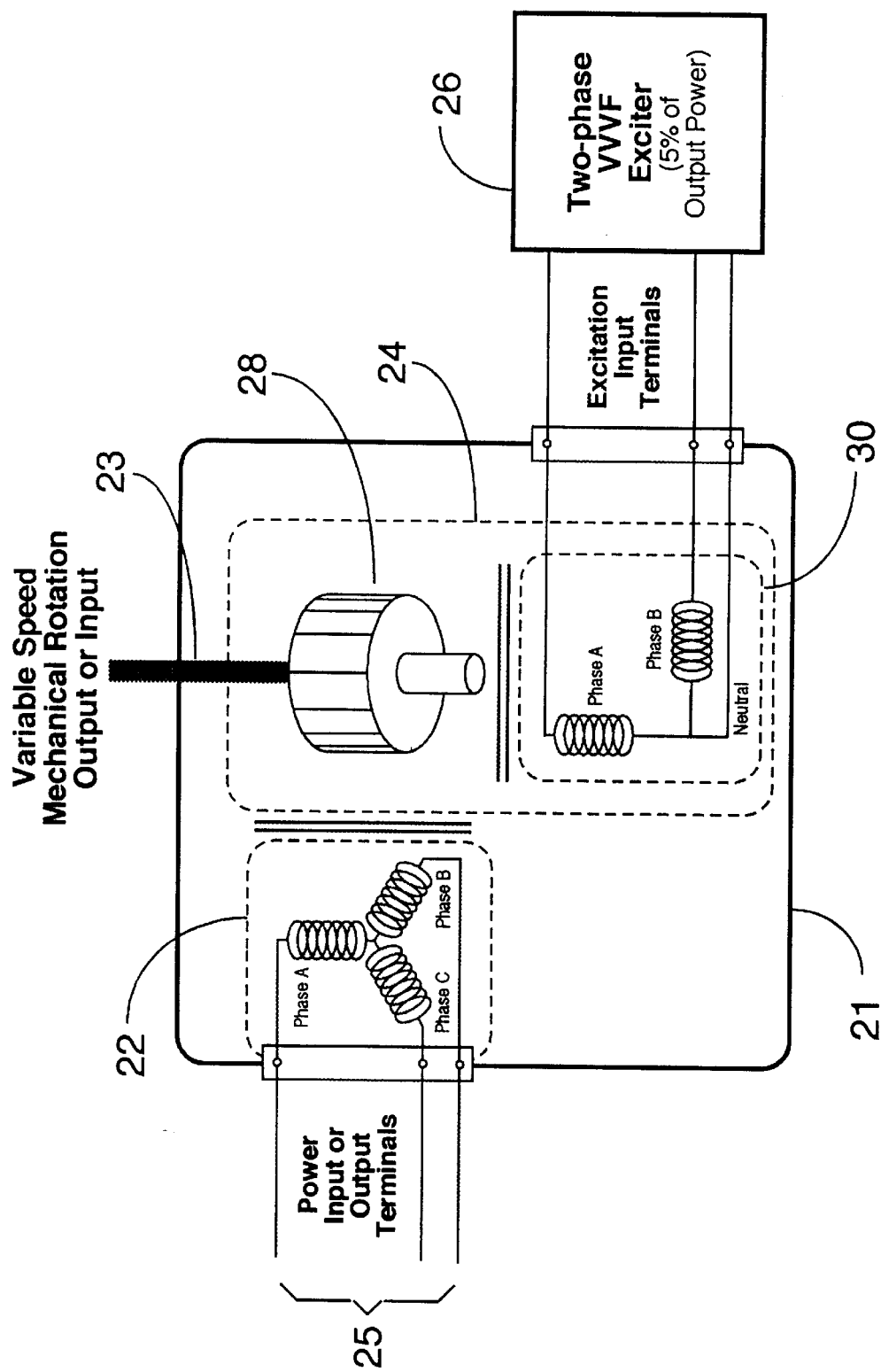
FIG. 1 is a conceptual schematic diagram of a SW,BACR machine system.

As illustrated in FIG. 1, a machine 21 of the present invention includes a three-phase (or other conventional design) stator 22 and a two-phase (biphase) AC rotor 24. As indicated by the duality shown in FIG. 1, the machine can operate as a motor or as an AC generator or alternator. As a motor, power is supplied to the stator terminals 25, and the shaft 23 provides the variable-speed, variable-torque, mechanical rotation output. As a generator or alternator, the shaft 23 is driven by a mechanical source (such as an engine) and variable voltage, variable-frequency power is supplied from the stator windings 25 to electrical loads.

In a motor or alternator system, the machine rotor is supplied by a two-phase, variable-voltage, variable-frequency exciter 26. In typical operation, the exciter only needs to control about 5% of the total system throughput. The rotating pole piece assembly 28 rotates with respect to stator 22 and is magnetically coupled to the two-phase rotor excitation coils 30, which do not rotate with respect to the stator 22 or the machine housing.

Figure 3:
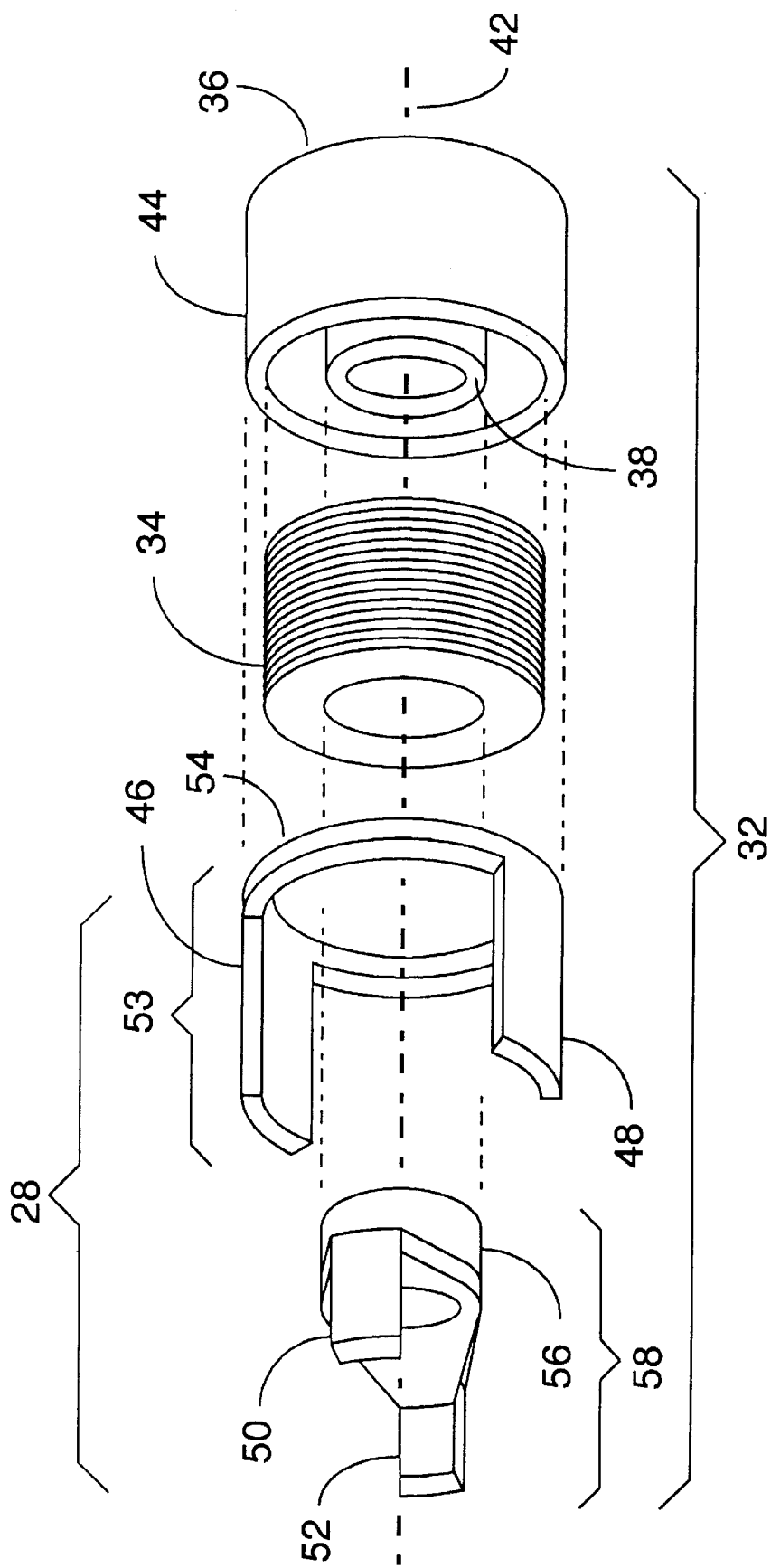
FIG. 3 is an exploded perspective view of the magnetic components of one phase of a four-pole rotor of a machine of the present invention.
Figure 4:
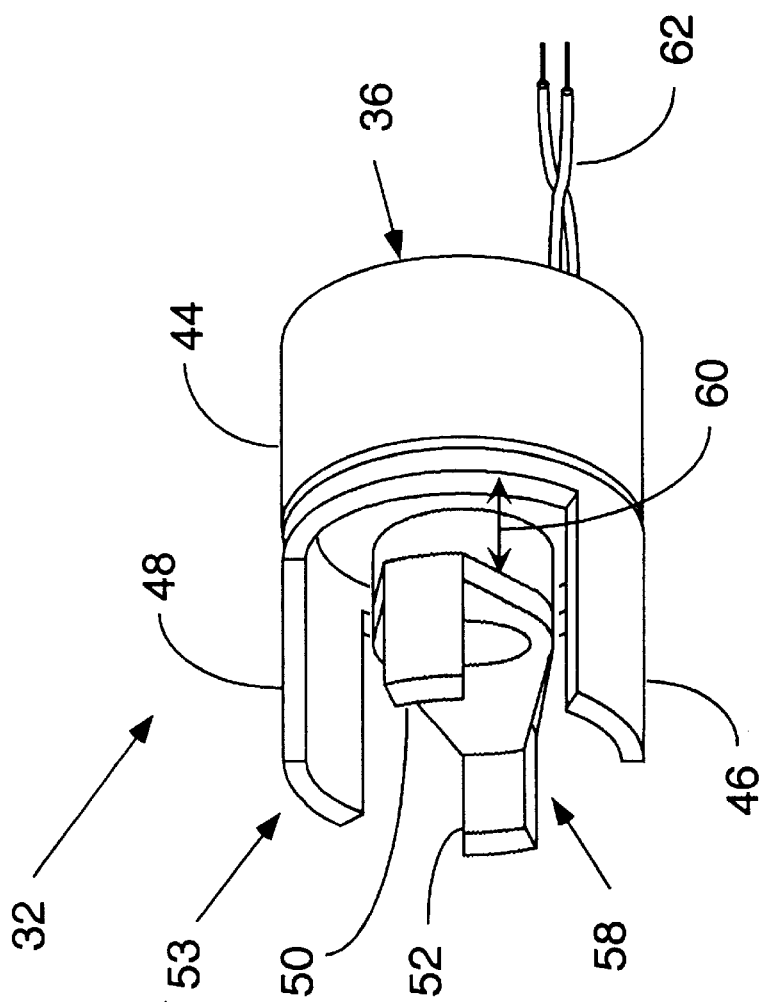
FIG. 4 is a perspective view of the components illustrated in FIG. 3 in an assembled state.
Figure 5:
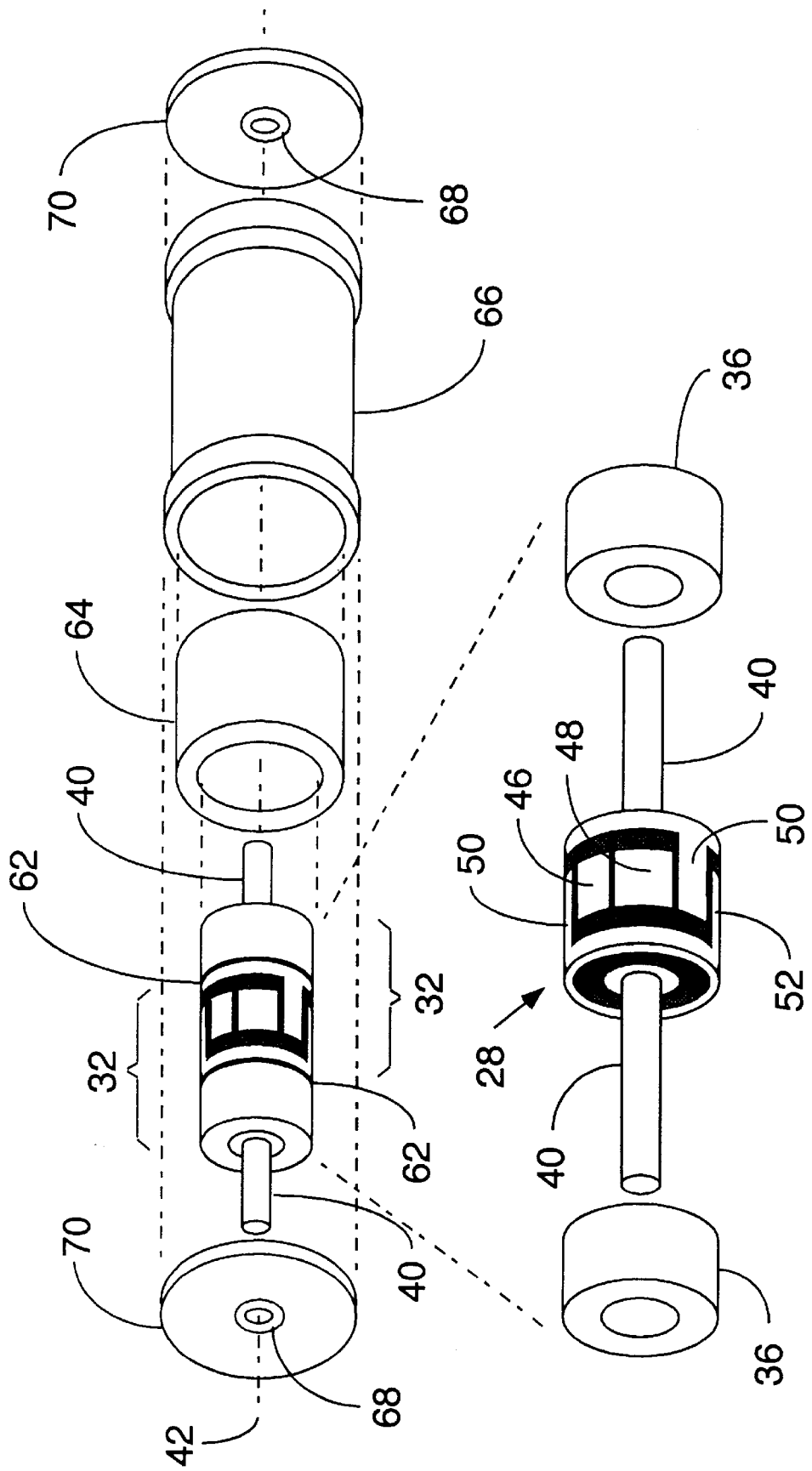
FIG. 5 is an exploded perspective view of the machine, with the rotor portion shown separately, enlarged and further exploded.

FIGS. 3 and 4 illustrate that portion of the rotor which defines each of the two phases. Two such rotor phase assemblies 32 are thus included in the machine, as illustrated in FIG. 5 and described in further detail below. Each rotor phase assembly 32 includes a solenoid-style coil 34 wound on a suitable form or bobbin and mounted within a cup-shaped magnetic core 36 with a center post 38. Center post 38 is hollow so that the machine's shaft 40 (see FIG. 5) can pass through it along the shaft's axis of rotation 42. In this configuration, when coil 34 is excited as described below, the magnetic field from one end of the coil is "folded," and both poles (which may for convenience be referred to as "north" and "south")are coaxial and available at the same end of coil 34, with the outer shell 44 of core 36 defining one pole (north) and center post 38 defining the other (south). Two elongated pole pieces or extensions 46 and 48, aligned along axis 42, couple magnetically with outer shell 44 and thus define two like rotor poles. Another two elongated pole pieces or extensions 50 and 52, aligned along axis 42, similarly couple magnetically with center post 38 and define two like rotor poles that are opposite in polarity from the rotor poles defined by extensions 46 and 48. Extensions 46 and 48 and the ring-like base 54 that supports them define a pole assembly 53. Similarly, extensions 50 and 52 and the smaller diameter ring-like base 56 that supports them define another pole assembly 58. Each of extensions 46, 48, 50 and 52 covers a sector-shaped area about 45 degrees in width. The gap 60 (see FIG. 4) between the extensions 50 and 52 and the support ring 54 for extensions 46 and 48 is preferably large in comparison to the other machine gaps, such as the rotor-to-stator gap, to prevent it from providing a low-reluctance flux path between the pole pieces.

The resulting rotor phase assembly 32 has a set of four semi-cylindrical pole pieces, each enclosing four opposing 45 degree segments of a cylindrical armature area. Note that coil 34 is enclosed between outer shell 44 and center post 38, and the electrical wire connections 62 to coil 34 are brought out through holes (not shown) in the closed end of core 36.

As illustrated in FIG. 5, the two rotor phase assemblies 32 of the machine are identical to one another and are assembled in opposing relation on shaft 40. The phase assembly 32 corresponding to one phase (referred to for convenience as "Phase A")is rotated 90 electrical degrees (45 physical degrees for the four pole machine) about axis 42 with respect to the phase assembly corresponding to the other phase (referred to for convenience as "Phase B"), extensions 46,48, 50 and 52 of the Phase A phase assembly 32 are interleaved with extensions 46, 48, 50 and 52 of the Phase B phase assembly 32. Suitable non-magnetic, non-conductive, low-friction, ring-shaped spacers/bearings (not shown for purposes of clarity) separate and provide suitable gaps 62 between each of pole assemblies 53 and 58 and its respective core 36 (FIG. 4). Gaps 62 are preferably small in comparison to other gaps in the system, primarily the rotor-to-stator gap, so that is has a negligible effect upon the magnetic parameters of the machine. Note that gaps 62 are at the core positions where the cross-sectional areas are maximized for minimum gap flux densities.

In accordance with the above-described embodiment of the invention, when the machine is in operation, the pole assembly 28 (see FIGS. 1 and 5), i.e., the portions of rotor phase assemblies 32 that include pole assemblies 53 and 58 (see FIGS. 3 and 4), rotates along with shaft 40, and rotates with respect to the stator 64 as well as the portions of rotor phase assemblies 32 that include cores 36. Although the above-described rotor has four poles, in other embodiments of the invention the rotor may have any other suitable number of poles common in electromechanical machine design. An integral multiple of four poles is structurally preferred.

The active rotor area, i.e., the rotating, interleaved pole assemblies 53 and 58 from each of the two phase assemblies 32, is filled with a non-magnetic, non-conductive material (not shown for purposes of clarity) to provide structural support and minimize windage losses. It is enclosed by a conventional stator 64, suitable designs for which are well-documented in the prior art. Stator 64 may have any suitable number of poles. The non-rotating cores 36 and coils 34 lie outside of the stator area and surround shaft 40. Shaft 40 is non-magnetic, so that it does not provide a stray flux path between the two phases. The entire rotor is surrounded by a suitable housing 66 of conventional design. Suitable rotor shaft bearings 68, endplates 70 and other mechanical structures well-known in the art that would normally be included in a commercial embodiment of a motor, such as thermal management structures, coil terminations, and external connections, may also be included, though they are not shown for purposes of clarity.

Figure 6:
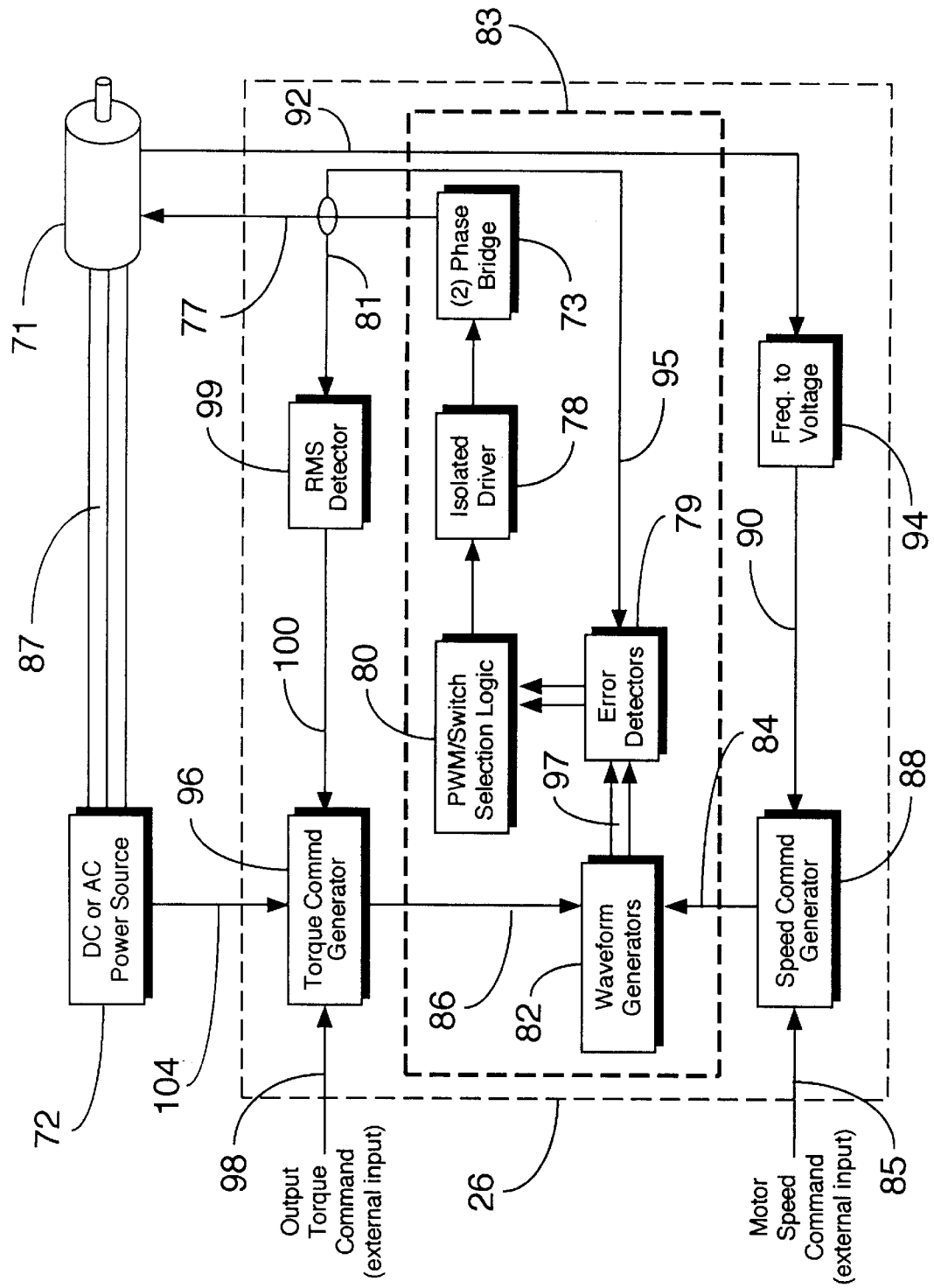
FIG. 6 is a block diagram of an AC, two-phase, VVVF exciter circuit of a motor system that includes the machine.
Figure 8:
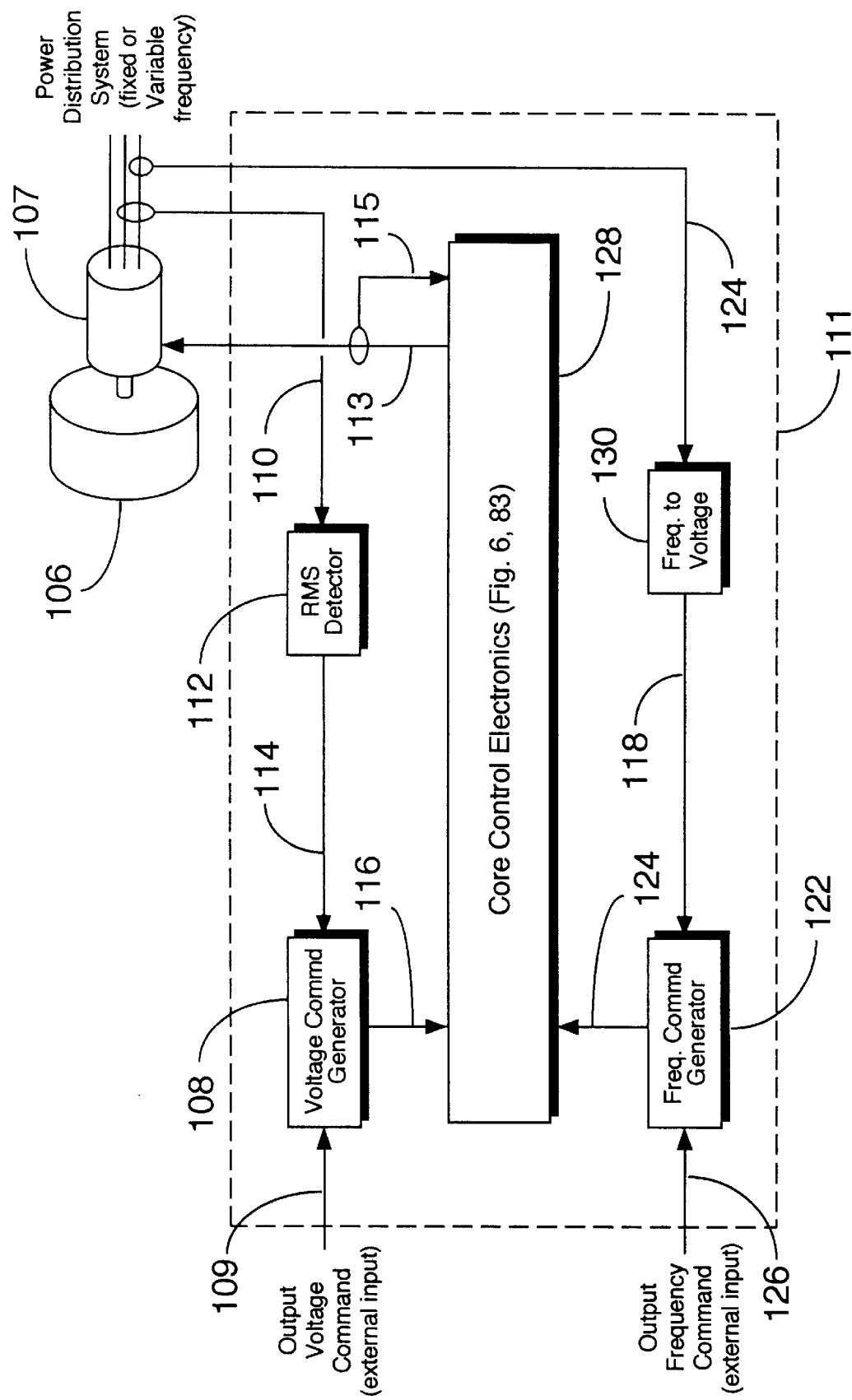
FIG. 8 is a block diagram of an AC, two-phase, VVVF exciter circuit of an AC generator/alternator system that includes the machine.

In combination with a suitable exciter, the machine can be used in a motor system, as illustrated in FIG. 6, or in an alternator or generator system, as illustrated in FIG. 8. As described in further detail below, the motor or generator system includes a two-phase, AC, VVVF power source 26, capable of being controlled by external commands and output parameter feedbacks. It acts as an exciter to create the independently-rotating magnetic field in the active rotor assembly, as described above, and is not in the primary input or output power path of the motor or alternator, respectively. Analysis and test data have shown that the exciter output requirement is only about 5% of the total machine output.

When used as a motor, the machine described below can provide variable-speed, variable-torque outputs when directly connected to a fixed-frequency, fixed-voltage source. When used as a generator, it can provide a controlled electrical output, with voltage and frequency independent of the speed of the driving source. No controller or power processor interposed between the machine and the electrical power interface is required for either application. The exciter described below provides variable speed control by giving rise to an electronically-controlled, independently-rotating, coaxial rotor magnetic field. The exciter generates a rotor magnetic field vector that can be electronically rotated, in a controlled fashion, with respect to the rotor structure. The angular velocity of the magnetic vector with respect to the rotor is proportional to the frequency of the applied rotor excitation. The angular velocity of the magnetic vector with respect to the stator is the algebraic sum of the frequency-related angular velocity and the actual rotational speed of the rotor. Thus, in the AC generator system, the frequency of the power induced in the stator is proportional to the algebraic sum of the two rotor angular velocities. In the motor application, the rotor spins at a speed that makes the algebraic sum of the rotating vector angular velocities equal to the angular velocity of the field vector supplied by the stator power.

An independently-rotating rotor field is generated using two-phase (biphase) coils and excitation. In this two-phase system, the two phase voltages are displaced by 90 electrical degrees. These excitation voltages are applied to a mechanical rotor pole assembly in which the poles are also displaced by 90 electrical degrees. See FIG. 1. This generates a constant-magnitude, rotating magnetic field, similar to the one created in the three-phase configuration, as shown by the calculation of the magnetic vector magnitude and angle (as derived from the common trigonometric identities):

$$\text{Magnitude}=m=M_{max}\{[\sin(\omega t)]^2+[\sin(\omega t+\pi/2)]^2\}^{1/2}=M_{max} \quad \text{(equation 1)}$$

$$\text{Angle}=\tan^{-1}(\omega t) \quad \text{(equation 2)}$$

where: m=instantaneous magnitude $M_{max}$=maximum magnitude

ωt=electrical angle

Two-phase approaches have been largely ignored in power systems, since they do not have the harmonic current and ground current cancellation inherent in the common three-phase approach. However, because of the capabilities of modern electronic exciters in this new machine system, these considerations are not significant for this application.

A. Motor Operation

When used in a variable-speed system, this electromechanical machine invention also requires a two-phase, VVVF source to act as an exciter for the machine's rotor, when operated in either its motor or generator mode. Most VSVF machine systems in use today require VVVF controllers interposed between the motor and its power source, which process 100% of the power throughput. In this system, the VVVF exciter for the rotor is out of the main power path, and its total power requirement is only about 5% of the system's power throughput. System power processing losses and thermal management provisions for electronics are therefore reduced by a factor of twenty.

Many versions of three-phase VVVF power processors and full-power motor controllers are common in prior art. There are even VLSI integrated circuits available in the commercial market to perform all the control functions required for variable-speed operation of three-phase, permanent magnet and induction motor systems incorporating full-power, series-connected controllers. No such designs are believed to be commercially available for two-phase VVVF power sources that could be used as exciters for this system.

A block diagram of a two-phase, VVVF exciter connected to a machine of the present invention 71, operating in the motor configuration, is shown in FIG. 6. Referring to that diagram, the stator windings of the motor are supplied from a utility or power source 72 which may be any of the following:

DC, with either fixed or variable voltage

Single-phase AC, with fixed-frequency, and either fixed or variable voltage

Single-phase AC, with variable-frequency, and either fixed or variable voltage

Three-phase AC, with fixed-frequency, and either fixed or variable voltage

Three-phase AC, with variable-frequency, and either fixed or variable voltage

Figure 7:
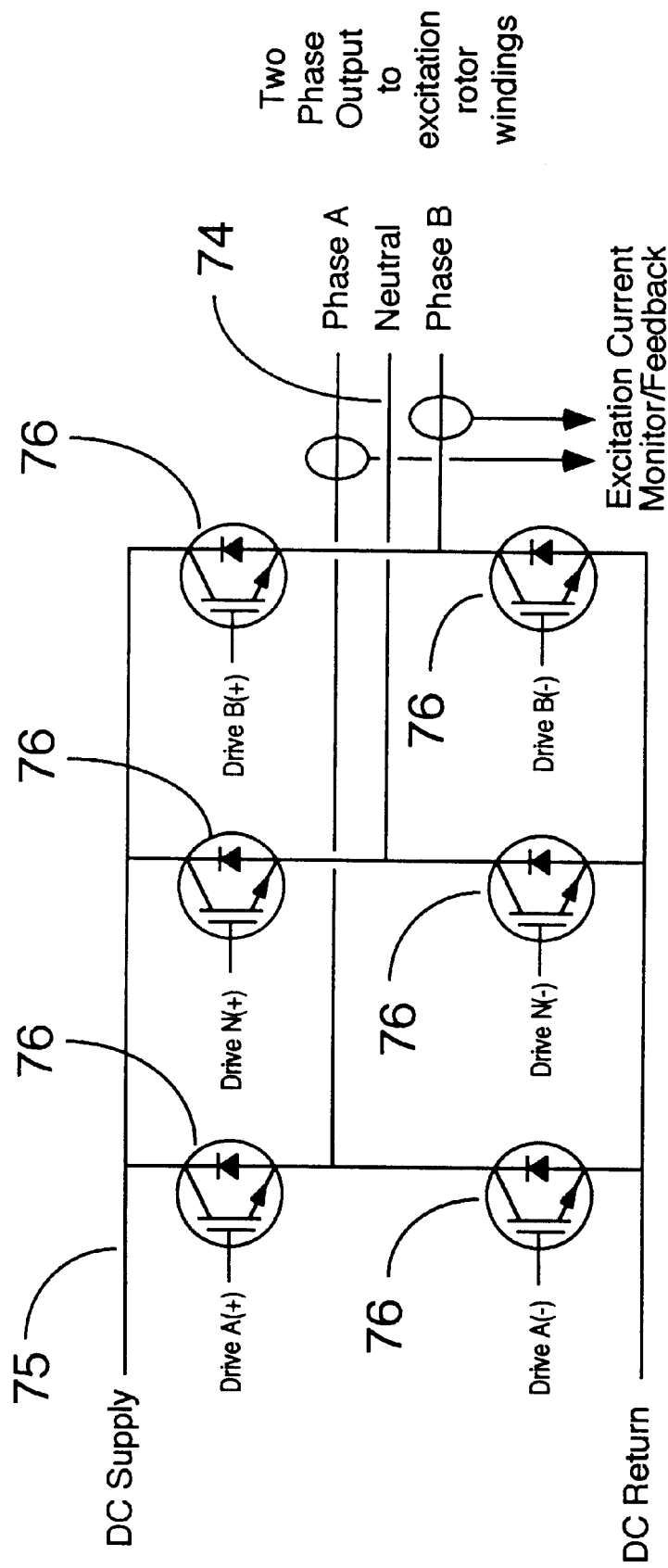
FIG. 7 shows the output bridge configuration for the exciter of FIG. 6.

The VVVF exciter 26 is powered by its own DC supply (not shown), which may be separately powered or derived from the main system power input 104, as defined above. The power for rotor excitation for the motor also comes from that DC supply. The exciter block diagram 26 of FIG. 6 is divided into a core excitation control block 83 (which is common for all applications), and other circuitry, which may change depending on the machine's mode of operation (i.e., motor, alternator, or vehicle drive). As shown in FIGS. 6 & 7, excitation power output is controlled by a two-phase, power semiconductor bridge 73 (FIG. 7), with a common neutral 74. The bridge switches 76 are operated in the high frequency, switched, pulse width modulation (PWM) mode to synthesize the sine waves which are applied to the rotor windings. The PWM mode utilized is of the general "buck" type, in which the rotor winding inductance takes the place of the normal output inductor, and provides sufficient current integration so that additional smoothing or filtering is not required for acceptable levels of output ripple. Again referring to FIG. 6, the isolated drivers 78 are commercially available, VLSI integrated circuits. They interface the low voltage command signals to the high-voltage, bridge power semiconductors. They also provide isolated ground references for the output semiconductors which are connected to the high-voltage rail 75 of the exciter supply.

The error detectors 79 utilize operational amplifiers to compare the instantaneous value 95 of each phase of the rotor current 77 with its respective reference signal 97 (created by waveform generators 82), at each high-frequency clock cycle, to determine the PWM duty ratio for bridge switches 76. The switch selection logic 80 then uses an additive fuzzy logic algorithm that involves linear membership functions of error signal magnitude, polarity of the reference signal, and rate-of-change of the reference command from waveform generators 82, to determine how the bridge switches 76 are to be sequenced to either raise or lower the two phase currents in the motor rotor. Once determined, the output switch states are loaded into a 6-bit digital output register (contained within 80), which interfaces with isolated drivers 78.

Waveform generators 82 provide two low-frequency, sine wave outputs 97 which contain both the amplitude and frequency information for the exciter current waveforms. They are constructed of commercially-available VLSI integrated circuits as follows: A single cycle of the output sine wave is digitized into 1024 steps. Digital equivalents of the instantaneous step amplitudes of the Phase A and Phase B sinewaves are stored in lookup tables in two PROMs (contained within 82). The reference signal is generated by outputting 8-bit digital words from the appropriate memory locations in the two PROMs. A 10-bit address bus is used to provide the 1024 step output time resolution for one cycle of the reference sine wave. The addresses are generated in sequence by applying a clock signal 84 to a conventional 10-bit binary counter, the outputs of which are applied to the PROM address bus. The rate-of-change and the frequency of the output signal is proportional to the speed at which we step through the table to generate a cycle of the output AC signal, and therefore proportional to the counter's clock frequency.

(Output sine wave frequency)=(Clock frequency)/1024 (equation 3)

The digital PROM outputs are connected to 8-bit, multiplying, digital-to-analog converters (mDAC) (contained within 82). In this configuration, these mDACs output an analog sine wave whose amplitude is multiplied by a separate analog command. The two inputs to waveform generators 82 are the binary counter clock signal 84, which controls the frequency of the output; and an analog multiplier command 86, which controls the amplitude of the output. This PROM-based approach also allows waveforms which are not pure sine waves. By adjusting the shape of the reference waveform, input current distortions which are often controlled by special winding distributions and mechanical arrangements, can be corrected electronically.

The main function of the speed command generator 88 is accomplished with a VLSI voltage-to-frequency (V-F) converter (contained within 88). Its output 84 is used directly as the counter clock. Therefore the motor speed command reference 85 is an analog signal whose level is proportional to the clock frequency. Since the counted-down clock frequency ultimately determines the two-phase output frequency, the analog speed command determines the output frequency for the sine waves applied to the machine's exciter windings. If the frequency of the power line 87 supplying the stator is fixed, we can have open loop output speed control. The motor operates synchronously, so the output speed is absolutely determined by the exciter frequency. In the closed loop mode, if the input frequency changes, the frequency of the clock 84 to the V-F converter is modified by the error signal between the external speed command and the average speed feedback. The speed feedback 90 takes a tachometer output 92 from the motor and converts its frequency to an analog voltage, using a VLSI frequency-to-voltage (F-V) converter 94, to be processed by the error detection circuitry (not shown) contained within the speed command processor 88. The reference generator and error detection circuitry in speed command processor 88 is implemented with IC operational amplifiers (not shown).

One way to gain an understanding of the relationship of rotor excitation frequency and the speed of the motor's output shaft is by considering the relationship between the angular velocities of the magnetic field vectors created by the stator and rotor. Since this is a synchronous machine, the stator magnetic field vector and the rotor magnetic field vector must synchronize with one another, and rotate at the same speed.

The independent rotor magnetic vector angular velocity is directly controlled by the frequency of the two-phase rotor excitation and the number of rotor poles:

$$\omega_{m-r} = 120 f_r / P_r \quad \text{(equation 4)}$$

where: $\omega_{m-r}$ is the electrically-created angular velocity of the rotor magnetic field vector with respect to the rotor structure, in RPM $f_r$ is the applied rotor frequency, in Hz $P_r$ is the number of rotor poles 120 is a constant Then the true angular velocity of the rotor magnetic field vector includes the physical angular velocity of the rotor structure:

$$\omega_r = \omega_{m-r} + \omega_{p-r} \quad \text{(equation 5)}$$

where: $\omega_r$ is the combined angular velocity of the rotor magnetic field vector in RPM $\omega_{p-r}$ is the physical angular velocity of the rotor or output shaft speed, in RPM The angular velocity of the rotating magnetic field vector created by the stator is a function of the three-phase main power input frequency and the number of stator poles.

$$\omega_{m-s} = 120 f_s / P_s \quad \text{(equation 6)}$$

where: $\omega_{m-s}$ is the electrically-created angular velocity of the stator magnetic field vector, in RPM;

$f_s$ is the applied stator frequency in Hz $P_s$ is the number of stator poles; and 120 is a constant.

For this synchronous machine, the actual rotor and stator magnetic field vector velocities must be equal:

$$\omega_{m-s} = \omega_r = \omega_{m-r} + \omega_{p-r} \quad \text{(equation 7)}$$

And the output shaft speed is the difference between the electrically-created magnetic field vector angular velocities:

$$\omega_{p-r} = \omega_{m-s} - \omega_{m-r} \quad \text{(equation 8)}$$

Since we have full control of the rotor excitation frequency through VVVF operation of the exciter (as described above), we have control of the output shaft speed, for any value of prime power frequency applied to the stator.

$$\omega_{p-r} = \omega_{m-s} - 120 f_r / P_r \quad \text{(equation 9)}$$

Equation 6 demonstrates that speed feedback is required in the mode when we require output speed control in applications wherein the stator power line frequency is changing.

if: $\omega_{m-s}$=increase or decrease by "x"% (equation 10)

then: $120 f_r / P_r$=must decrease or increase by the same "x"% (equation 11)

so: $f_r$=must decrease or increase by the same "x"% (equation 12)

if: $\omega_{p-r}$=remains constant=commanded value (equation 13)

Referring back to FIG. 6, output torque may be controlled by adjusting the flux magnitude of the rotor field, through adjustment of the RMS magnitude of the excitation current 77 in the rotor windings. As pointed out above, the magnitude of the rotor excitation current is proportional to the output torque, and can be controlled by the analog input 86 to the mDACs in waveform generators 82. The torque command generator 96 is a closed loop feedback control. The analog torque command 98 from an external controller (not shown) is summed with the RMS exciter current feedback 100. The RMS detector 99 is a VLSI circuit which provides an analog signal proportional to the RMS exciter current value 81. The error signal from the summation is used to set an amplitude reference signal 102, which controls the value applied to the multiplier input of the mDACs in waveform generators 82. In addition, there is an input line voltage monitor input 104 to allow for torque compensation in response to power line voltage variations.

The exciter-motor system can be operated in several different control modes:
   a. Open loop—external speed command, with a fixed torque reference
   b. Commanded torque—closed-loop torque, with fixed or variable open-loop speed
   c. Frequency/speed compensation—closed-loop control of the waveform generator clock frequency. This mode adjusts the rotor frequency to keep the output shaft speed at the commanded value if the if the power source frequency changes.

d. Voltage compensation—closed-loop control of the waveform generator output reference amplitude. This mode adjusts the rotor excitation current to keep the output shaft torque at the commanded value if the if the power source voltage changes.

e. All of the above four control modes can be used to create dynamically-commanded, variable-speed, variable-torque (VSVT) outputs through control of the two external command signals.

B. AC Generator/Alternator Operation

Since an electromechanical machine of this type is, by nature, bilateral, it can also be operated as a variable-frequency, variable-speed, variable-voltage AC generator or alternator. FIG. 8 is a generalized block diagram that illustrates this mode of operation. The input mechanical driver or engine 106 may run at any convenient speed, and the output power from the SW,BACR alternator 107 may be any of the following:

Single-phase AC, with fixed-frequency, and either fixed or variable voltage

Single-phase AC, with variable-frequency, and either fixed or variable voltage

Two-phase AC, with fixed-frequency, and either fixed or variable voltage

Two-phase AC, with variable-frequency, and either fixed or variable voltage

Three-phase (or other poly-phase) AC, with fixed-frequency, and either fixed or variable voltage Three-phase (or other poly-phase) AC, with variable-frequency, and either fixed or variable voltage Considering the separately-excited, synchronous alternator the dual of the motor, simple manipulation of the preceding equations shows that the output frequency is controlled by the total angular velocity of the rotor magnetic field vector. The total rotor field vector is the algebraic sum of the angular velocity of the physical rotor structure and the frequency-controlled angular velocity of the rotor magnetic field vector.

An example using a three-phase stator is:

$$\omega_{m-s} = 120 f_s / P_s \quad \text{(equation 6)}$$

$$\text{so: } f_s = \omega_{m-s} P_s / 120 \quad \text{(equation 14)}$$

$$\omega_{m-s} = \omega_r = \omega_{m-r} + \omega_{p-r} \quad \text{(equation 7)}$$

$$f_s = [\omega_{m-r} + \omega_{p-r}] P_s / 120 \quad \text{(equation 15)}$$

$$\omega_{m-r} = 120 f_r / P_r \quad \text{(equation 4)}$$

$$\text{and: } f_s = P_s[(f_r / P_r) + (\omega_{p-r} / 120)] \quad \text{(equation 16)}$$

The rotor exciter core control electronics 128 are the same for alternator operation as for the motor operation case (FIG. 6, 83). Only the detector and command generator gains and feedback quantities are changed. And while the scaling may now be different, the basic nature of the feedbacks is also the same. The motor "torque command generator" becomes the output voltage command generator 108 for the alternator. Two phases 110 of the output are sampled.

Because of the usual three-phase summations, error in the third phase voltage may be calculated from errors in the other two. An RMS voltage detection circuit 112 provides and analog command 114 proportional to the RMS voltage. As in the motor controller embodiment described above, the error signal 116 is used to control the amplitude the output of waveform generators in the core control electronics 128. Instantaneous alternator excitation current 113 is monitored and fed back 115 to the error detectors in the core control electronics 128. This adjusts the rotor excitation current and provides direct control of the stator output voltage, through the same PWM/switch selection logic 80, isolated drivers 78, and power semiconductor bridge 73 described above with respect to 83 in the motor exciter embodiment of FIG. 6.

The speed command in the motor exciter embodiment becomes the frequency command 126 in the alternator exciter embodiment. Output frequency is sampled from one of the output phases 124, scaled and applied to the F-V converter 130. Its output 118 is summed with the output frequency command 126 in the frequency command generator 122 to generate the clock frequency 124 for the waveform generator in the core control electronics in a way identical to the motor exciter design.

As in the case for the motor operation, the PROM-based waveform generator approach allows for reference waveforms which are not pure sine waves. By adjusting the shape of the reference waveform, output voltage distortions which are often controlled by special winding distributions and mechanical arrangements, are corrected electronically by adjusting the rotor excitation waveshape to compensate for them.

C. Other Power Sources

Figure 9:
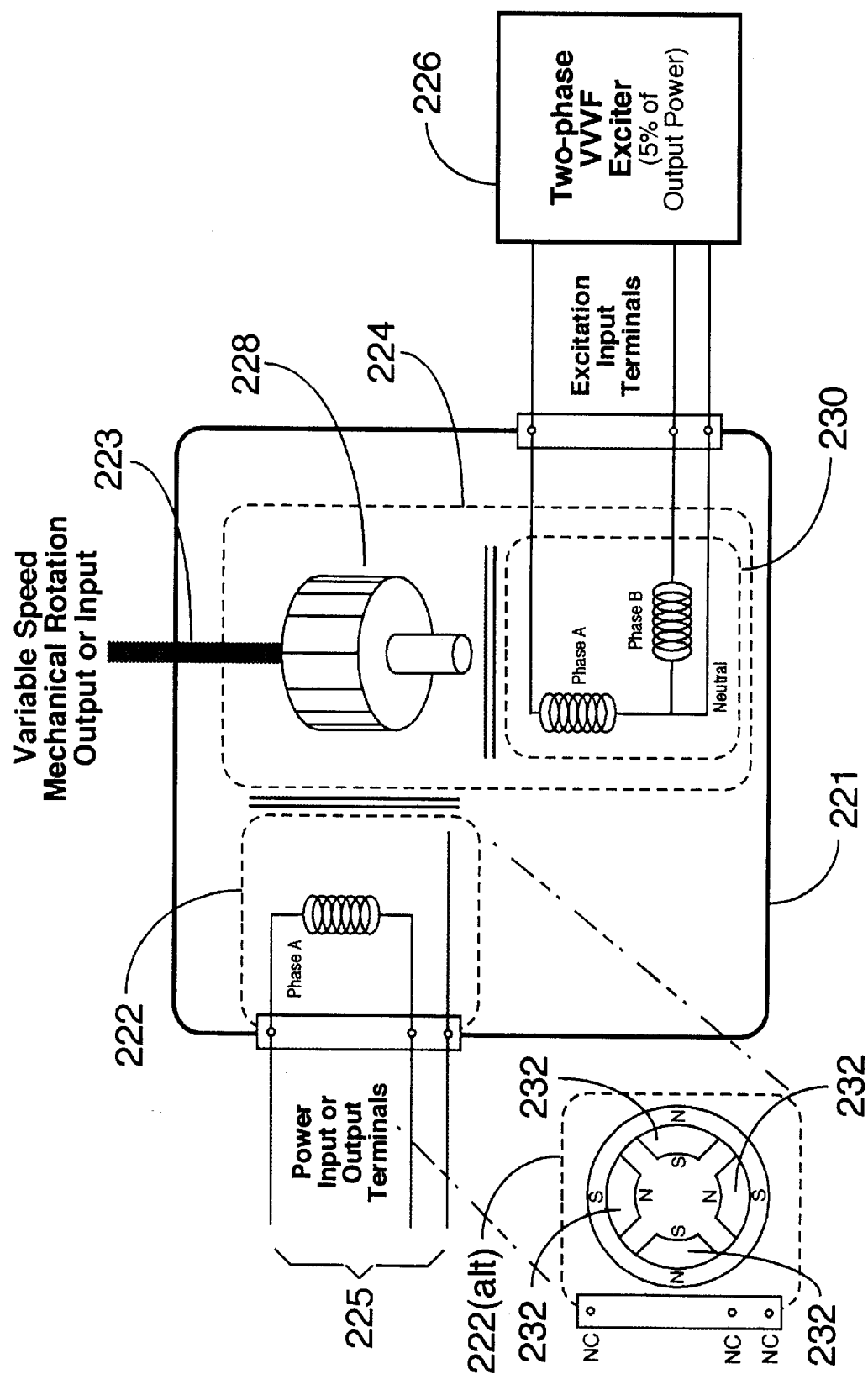
FIG. 9 is a conceptual schematic diagram of the machine with a single-phase or DC-powered stator, operating as a SW,BACR motor or AC Generator/Alternator.

As illustrated in FIG. 9, in an alternative embodiment the machine of the present invention 221 includes a single-phase stator 222 and a two-phase (biphase) rotor 224. Stator 222 is a conventional single-phase stator well-known to persons of skill in the art and therefore not described in further detail herein. Rotor 224 is identical to that described above with respect to the embodiment illustrated in FIG. 1. The machine can operate as a motor or as a generator or alternator. As in that embodiment, the rotating pole assembly 228 rotates with respect to stator 222 and is magnetically coupled to the two-phase rotor excitation coils 230, which do not rotate with respect to stator 222. The rotor is excited by a VVVF exciter 226 and the speed of the motor shaft 223 or the output voltage 225 frequency of the alternator may be calculated as described by equations 4 through 16.

FIG. 9 also illustrates two alternative embodiments wherein the electromechanical machine of this invention operates only as a motor; and the stator has a fixed, non-rotating magnetic field. In the first of these, the stator 222 is powered 225 by DC instead of single-phase AC power. In this case, since the stator magnetic field vector is fixed, the output shaft 223 speed is directly determined by the ratio of rotor to stator poles and the rotor excitation frequency.

$$\omega_{m-s} = 0 \quad \text{(equation 17)}$$

$$\omega_r = \omega_{m-r} = 120 f_r / P_r / P_s \quad \text{(equation 18)}$$

The second of these motor embodiments, related to the non-rotating magnetic field, uses an alternative stator 222 (alt) in which the DC coils are replaced by sets of permanent magnets 232, and there are no stator electrical connections. Magnetic polarities are as shown on the magnets 232. The example in FIG. 9 is for a four-pole stator. The fixed stator field vectors are the same as a four-pole DC stator case, and the output shaft speed is also determined by equations 17 and 18.

D. Vehicle Operation

Figure 10:
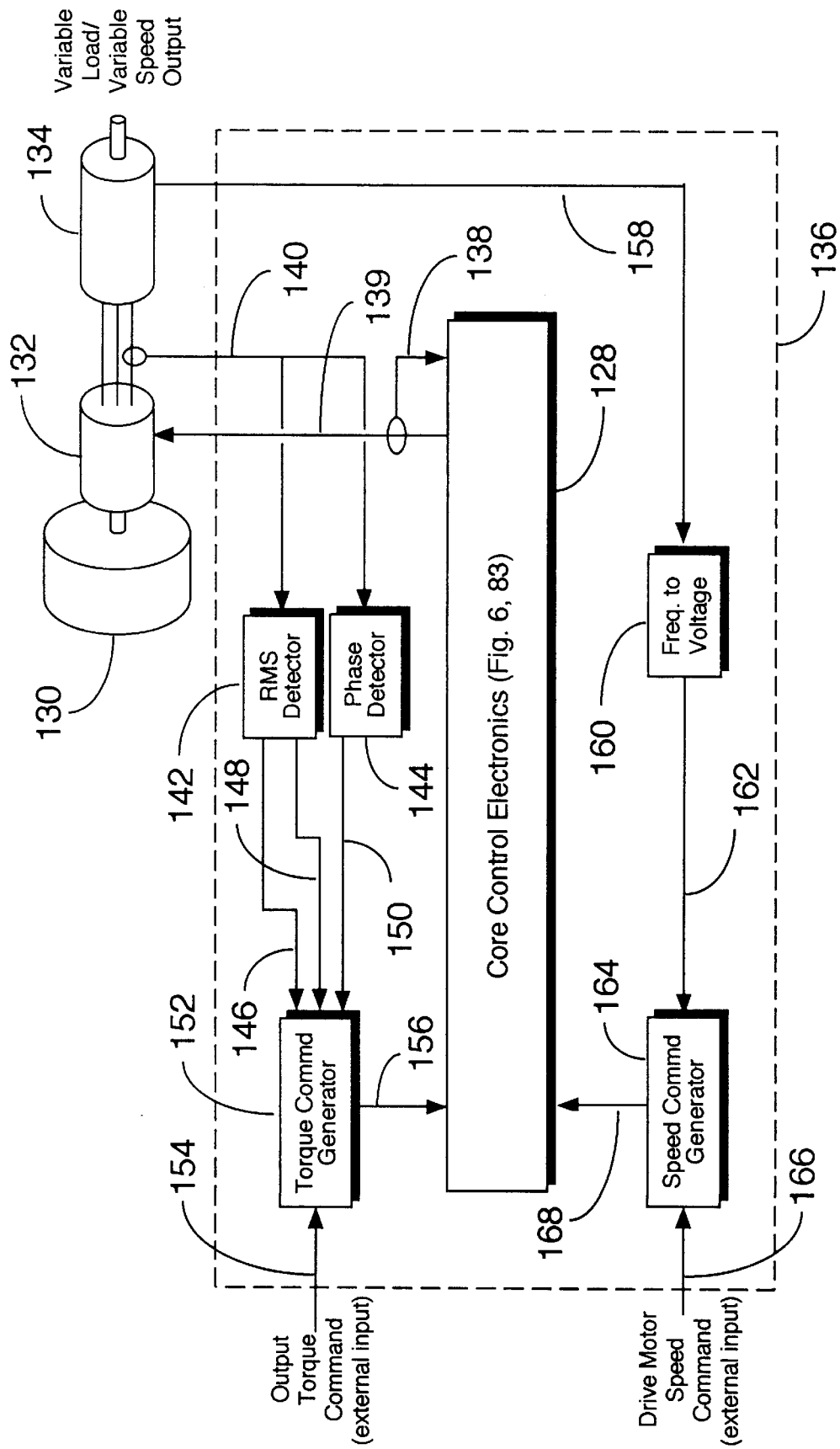
FIG. 10 is a block diagram of an AC, two-phase, VVVF exciter circuit of an AC generator/alternator system in a hybrid vehicle, electric drive system.

FIG. 10 is a generalized block diagram of the VSVF alternator system, used in a hybrid-electric vehicle drive.

Because of the inherent high-speed capability of this invention (when compared to existing, conventional, separately-excited machines), the driving engine 130 can be either a high-speed turbine or a low-speed reciprocating type. The alternator 132 may be directly driven, without requiring speed adjustment gears. Since the alternator voltage and frequency can be fully controlled by the VVVF exciter, alternator 132 can be connected directly to a conventional (induction or permanent magnet) drive motor 134, to provide VVVF power directly to the output drive motor without the usual interposed, VVVF motor controller. Through elimination of the full-power, series-connected controller, the drive system efficiency is significantly improved through the elimination of the controller losses. The mechanical systems are also improved through elimination of the thermal management system for the conventional high-power motor controller.

The exciter 136 for this application utilizes the same rotor exciter core control electronics 128 as for both A and B above. The application specific electronic elements are functionally similar to portions of the hardware for both the motor and alternator operation. Feedback 138 of the instantaneous value of the rotor excitation current 139 is again used for closed-loop PWM control of the output bridge power semiconductor switches. Alternator output current and voltage 140 from one phase are fed back to RMS detector 142 and to phase angle detector 144. The output analog signals for voltage 146, current 148, and phase 150 are used by the torque command generator 152 to calculate the torque-producing power, which is scaled and compared to the output torque command 154 to generate the analog command 156 used by the mDACs in the waveform generators in the core electronics.

The speed command 158 and feedback control loop is identical to the SW,BACR motor speed control function, even though the tachometer is on the conventional output motor rather than a SW,BACR motor. The tachometer feedback signal 158 is connected to the VLSI-based, frequency-to-voltage converter 160 which provides an analog output 162 proportional to the output speed. The analog speed signal is compared to an externally-supplied analog drive motor speed command 166 in the speed command generator to create the clock signal for the waveform generators in the core electronics.

Figure 11:
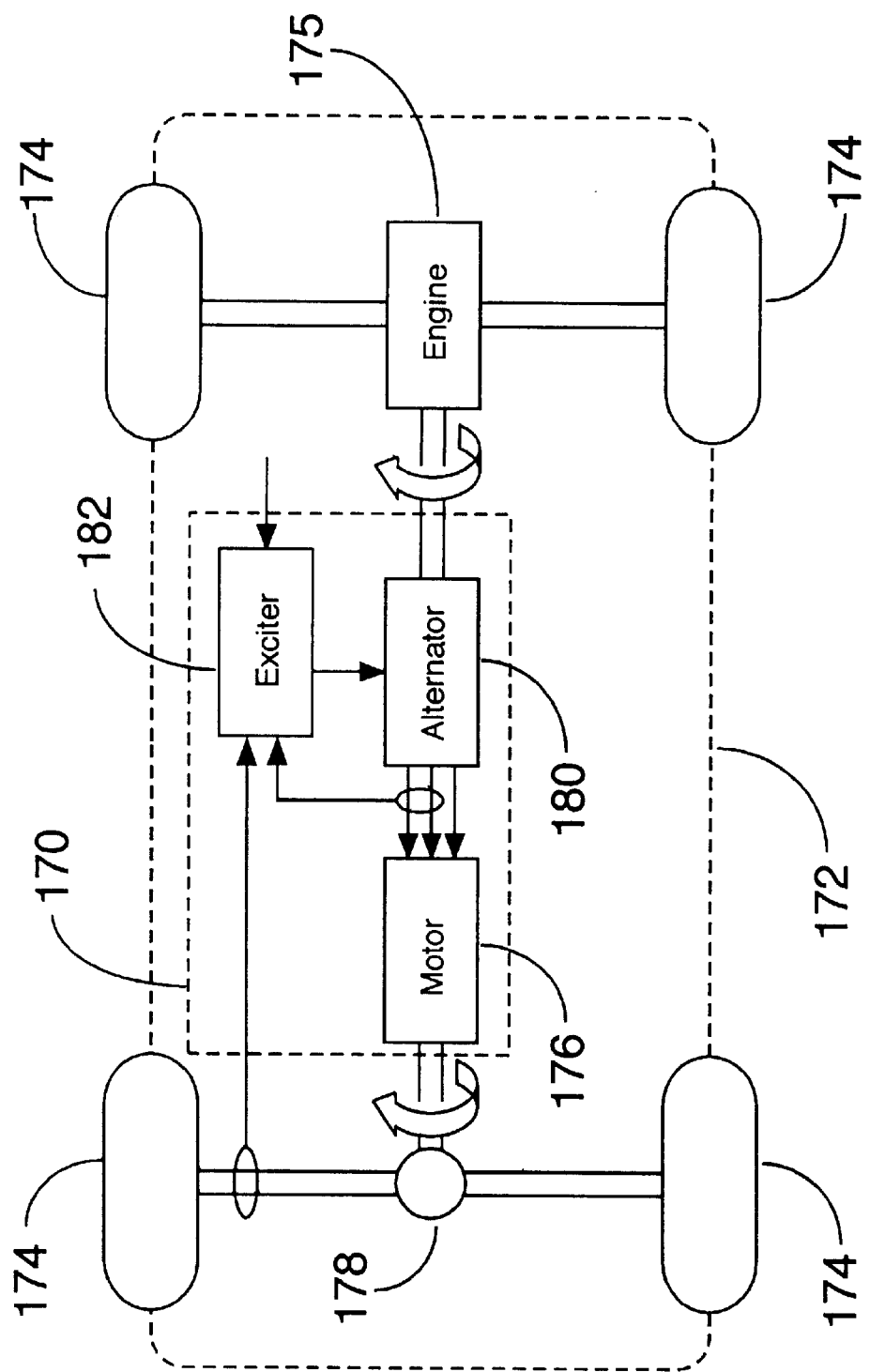
FIG. 11 is a conceptual schematic diagram of the three-phase, SW,BACR AC Generator/ Alternator system in a hybrid vehicle drive system.

FIG. 11 shows how an output drive and electronic control 170 based on this invention fits into and significantly improves an overall hybrid vehicle system. Drive system 172 includes four wheels 174, two of which are driven by a suitable conventional motor 176 via a driveshaft and differential 178. An SW,BACR alternator 180 is driven by a conventional turbine or other suitable engine 175. The alternator and its exciter circuit 182, as described above with respect to FIG. 10, provide VVVF input power to the drive motor, with no VVVF controller needed between the alternator and the motor to achieve variable-speed, variable-torque operation. Control of the engine speed is not required for output speed and torque control, and it may be operated at its optimum RPM appropriate to the required load.

Figure 12:
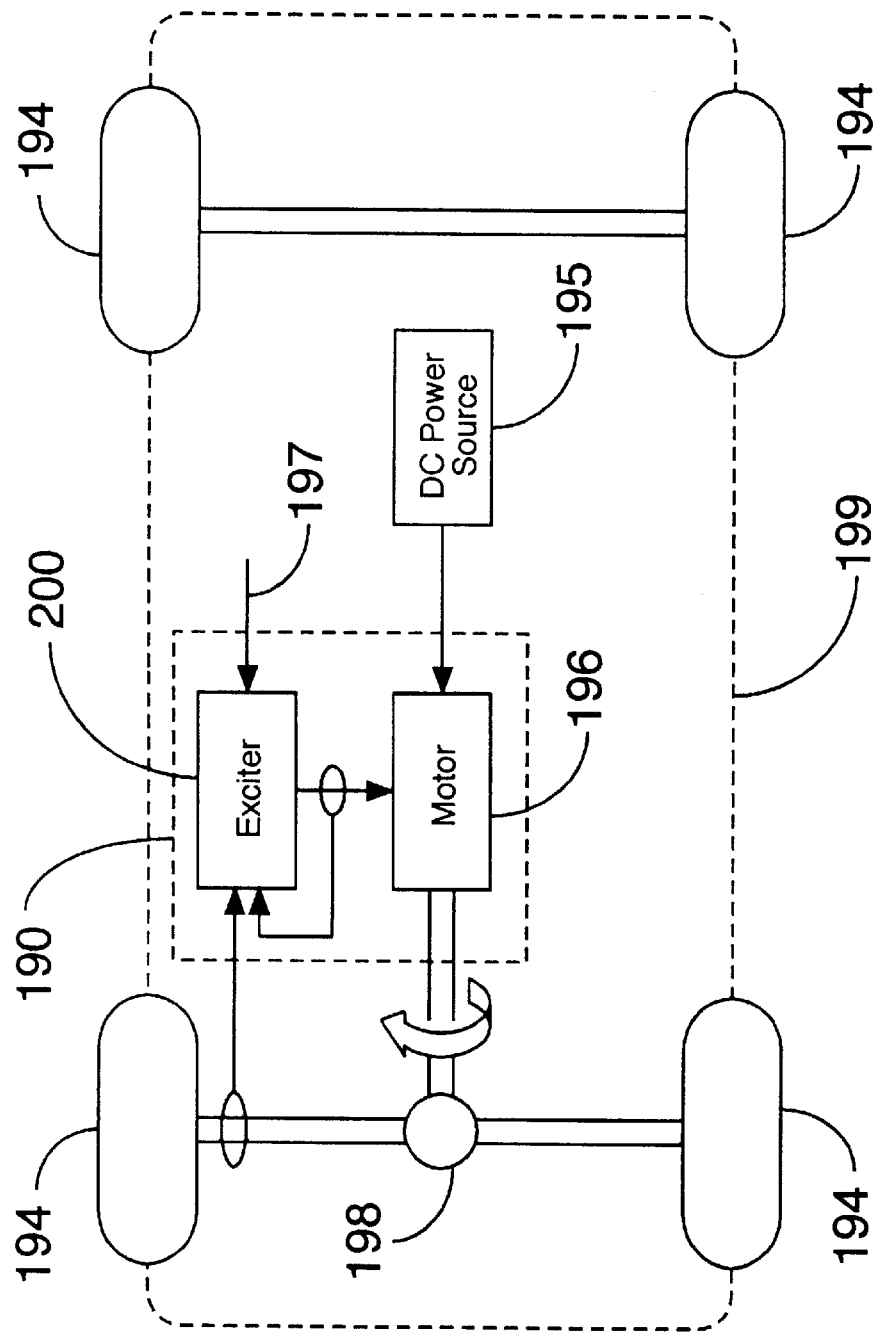
FIG. 12 is a conceptual schematic diagram of the three-phase, SW,BACR AC motor system in an electric vehicle drive system.

FIG. 12 shows an embodiment of this invention appropriate to an all-electric vehicle drive system 199. Since this invention may be operated as a variable-speed, variable-torque (VSVT) motor with fixed DC stator excitation, the motor with its exciter become key elements in a significantly improved output drive and electronic control 190. Drive system 199 includes four wheels 194, two of which are driven by a SW,BACR motor 196 via a driveshaft and differential 198. The motor is directly connected to an appropriate DC power source 195 (i.e., battery, fuel cell, etc.). The motor and its exciter circuit 200, as described above with respect to FIG. 7, provide variable-speed, variable-torque (VSVT) output power to the drive shaft, through the differential, and to the wheels, with no VVVF controller needed between the DC power source and the motor to achieve VSVT operation.

While the examples described above with respect to FIG. 11 and FIG. 12 show four wheel vehicles with two wheel drive, it is equally appropriate to use this technology on many other vehicle configurations. Two or three wheel vehicles may be used with the basic configurations described. However, it is in vehicles with independent, multi-wheel drive systems that this machine structure offers even more advantages. If individual motors are connected to each of the drive wheels, torque and speed of each can be independently controlled for traction under adverse conditions, slow speed maneuverability, and enhanced stability. Since the motors are individually controlled, normal (constant or slowly-changing) speed operation is simplified by electronic synchronization of the clocks and waveform generators in the exciters for each of the motors, and complex mechanical coupling hardware in existing systems is eliminated.

This invention is applicable for, but not limited to, the following systems:

1) variable-speed motor operation from fixed-frequency three-phase electrical utility mains;
2) variable-speed motor operation from fixed voltage DC power sources;
3) fixed-speed or variable-speed motor operation with three-phase AC variable-voltage, variable-frequency power supplies;
4) fixed-speed or variable-speed motor operation from variable voltage DC power sources;
5) variable-speed motor operation from fixed-frequency single-phase electrical utility mains without the need for special starting windings or capacitors; and
6) fixed-speed or variable-speed motor operation with single-phase AC variable-frequency power supplies without the need for special starting windings or capacitors. As such, they become enabling components for cost effective larger systems, such as:
7) battery or fuel cell powered, all-electric vehicle drive systems;
8) mobile, engine-driven AC auxiliary power sources with controlled output frequency and voltage, decoupled from engine speed;
9) engine or turbine-driven, variable-speed alternator, synchronized to fixed-frequency utility mains, as a co-generation power source; and
10) engine-driven, variable-frequency, direct-connected alternator/motor interlink for hybrid vehicle drives.

It will be evident that there are additional embodiments which are not illustrated above, but which are clearly within the scope and spirit of the present invention. The above description and drawings are therefore intended to be exemplary only, and the scope of the invention is to be limited solely by the appended claims.

What is claimed is:

1. A rotor for use in an electromechanical machine functioning as either a motor or an alternator, the electromechanical machine having a rotatable shaft along an axis of rotation, the rotor comprising:

a first and a second phase assembly, each of the first and the second phase assembly comprising:

a cup-shaped core concentric with the rotatable shaft;
a coil disposed inside said cup-shaped core and solenoid-wound with respect to the axis of rotation to provide two coaxial poles at a single end of said cup-shaped core, said coil and cup-shaped core non-rotating and fixedly mounted within the electromechanical machine; and
two pole-piece assemblies positioned so that a magnetic field from said two coaxial poles is coupled to said two pole-piece assemblies without direct physical contact, said two pole-piece assemblies fixedly mounted to said rotatable shaft, each polepiece assembly having two or more pole pieces elongated in a direction parallel to said axis of rotation;
wherein said two or more pole pieces of said first phase assembly are interleaved with said two or more pole pieces of said second phase assembly.

2. A electromechanical machine functioning as either a motor or an alternator, said electromechanical machine mountable to a non-rotating fixture, comprising:
a stator fixedly mounted to said non-rotating fixture and concentric with an axis of rotation;
a shaft rotatable along said axis of rotation; and
a rotor having a first and a second rotor phase assembly, each rotor phase assembly comprising:
a cup-shaped core;
a coil disposed inside the cup-shaped core, the coil solenoid-wound with respect to said axis of rotation to provide two poles at a single end of said cup-shaped core, said coil and cup-shaped core non-rotating and fixedly mounted to said non-rotating fixture;
two pole assemblies fixedly mounted to and rotating with said shaft, each pole assembly of said two pole assemblies having a plurality of pole pieces, each pole piece of said plurality of pole pieces elongated in a direction parallel to said axis of rotation and magnetically coupled to at least one of said two poles of said cup-shaped core,
wherein said plurality of pole pieces of said first rotor phase assembly are interleaved with said plurality of pole pieces of said second rotor phase assembly.

3. A hybrid electric vehicle drive system, comprising:
a vehicle drive train;
an engine;
an alternator, comprising:
a stator having three-phase or other polyphase AC windings;
a shaft, mechanically coupled to said engine, said shaft aligned along an axis of rotation and rotatably mounted with respect to said stator; and
a rotor having two single-phase assemblies, each single-phase assembly having a coil, a cup-shaped core, and two pole-piece assemblies, said coil disposed inside said cup-shaped core and solenoid-wound with respect to said axis of rotation to provide two coaxial poles at a single end of said cup-shaped core, said coil and cup-shaped core fixedly mounted and non-rotating with respect to said stator, said two pole-piece assemblies fixedly mounted to and rotating with said shaft, said coil and cup-shaped core positioned adjacent to but not in physical contact with said two pole-piece assemblies to provide magnetic excitation to said two pole-piece assemblies independent of an angular orientation of said two pole piece assemblies about said axis of rotation, each of said two pole-piece assemblies having two or more pole pieces, each of said two or more pole pieces elongated in a direction parallel to said axis of rotation and having an end adjacent to and in magnetic communication with one or more of said two coaxial poles at said cup-shaped core, said two or more pole pieces of one said single-phase assembly interleaved with said two or more pole pieces of another said single-phase assembly; and
a two-phase AC rotor exciter electrically coupled to said rotor for controlling the AC output from said alternator's stator; and
a three-phase or other polyphase AC induction, switched reluctance, or permanent magnet motor receiving electrical power directly from said alternator, and mechanically coupled to said vehicle drive train.

4. An electric vehicle drive system comprising:
a vehicle drive train;
a motor, comprising:
a stator, having direct current (DC) windings;
a shaft aligned along an axis of rotation and rotatably mounted with respect to said stator; and
a rotor having a first and a second single-phase assembly, each single-phase assembly having a coil, a cup-shaped core, and two pole assemblies, said coil disposed inside said cup-shaped core and solenoid-wound with respect to said axis of rotation to provide two coaxial poles at a single end of said cup-shaped core, said coil and cup-shaped core fixedly mounted and non-rotating with respect to said stator, said two pole assemblies fixedly mounted to said shaft, said coil and cup-shaped core positioned adjacent to but not in physical contact with said two pole assemblies to provide magnetic excitation to said two pole assemblies independent of an angular orientation of said two pole assemblies about said axis of rotation, each pole assembly having two or more pole pieces, each of said two or more pole pieces elongated in a direction parallel to said axis of rotation and having an end adjacent to and in magnetic communication with one or more of said two coaxial poles at said cup-shaped core, said two or more pole pieces of said first single-phase assembly interleaved with said two or more pole pieces of another said second single-phase assembly; and
a two-phase AC rotor exciter electrically coupled to said rotor for controlling said motor and mechanically coupled to said vehicle drive train.

5. A rotating, electromechanical, separately-excited, machine, which may function as either a motor or an alternator, comprising:
a stator;
a shaft aligned along an axis of rotation and rotatably mounted with respect to said stator; and
a rotor having two single-phase assemblies, each single-phase assembly having a coil, a cup-shaped core, and two pole piece assemblies, said coil disposed inside the cup-shaped core and solenoid-wound with respect to said axis of rotation to provide two coaxial poles at a single end of said cup-shaped core, said coil and cup-shaped core positioned so that a magnetic field from said two coaxial poles is coupled to said two pole piece assemblies to provide magnetic excitation for said two pole piece assemblies, said magnetic excitation independent of an angular orientation of said two pole piece assemblies about said axis of rotation, said coil and cup-shaped core having no direct physical contact to said two pole piece assemblies orto said shaft, said coil and cup-shaped core fixedly mounted and non-rotating with respect to said stator, said two pole piece assemblies fixedly mounted to said shaft, each of said two pole piece assemblies having two or more pole pieces, each of said two or more pole pieces elongated in a direction parallel to said axis of rotation and having an end adjacent to and in magnetic communication with one or more of said two coaxial poles at said cup-shaped core, said two or more pole pieces of one said single-phase assembly interleaved with said two or more pole pieces of another said single-phase assembly.

6. The rotating electromechanical machine claimed in claim 5, wherein said stator has single-phase windings.

7. The rotating electromechanical machine claimed in claim 5, wherein said stator has three-phase windings.

8. The rotating electromechanical machine claimed in claim 5, wherein said machine operates only as a motor, and said machine's stator has direct current (DC) windings.

9. The rotating electromechanical machine claimed in claim 5, wherein said machine operates only as a motor, and said machine's stator has a fixed magnetic field created by permanent magnets.

* * * * *